V. A. BOKER.
TRACTOR.
APPLICATION FILED OCT. 18, 1915.
1,214,643.
Patented Feb. 6, 1917.
5 SHEETS—SHEET 5.
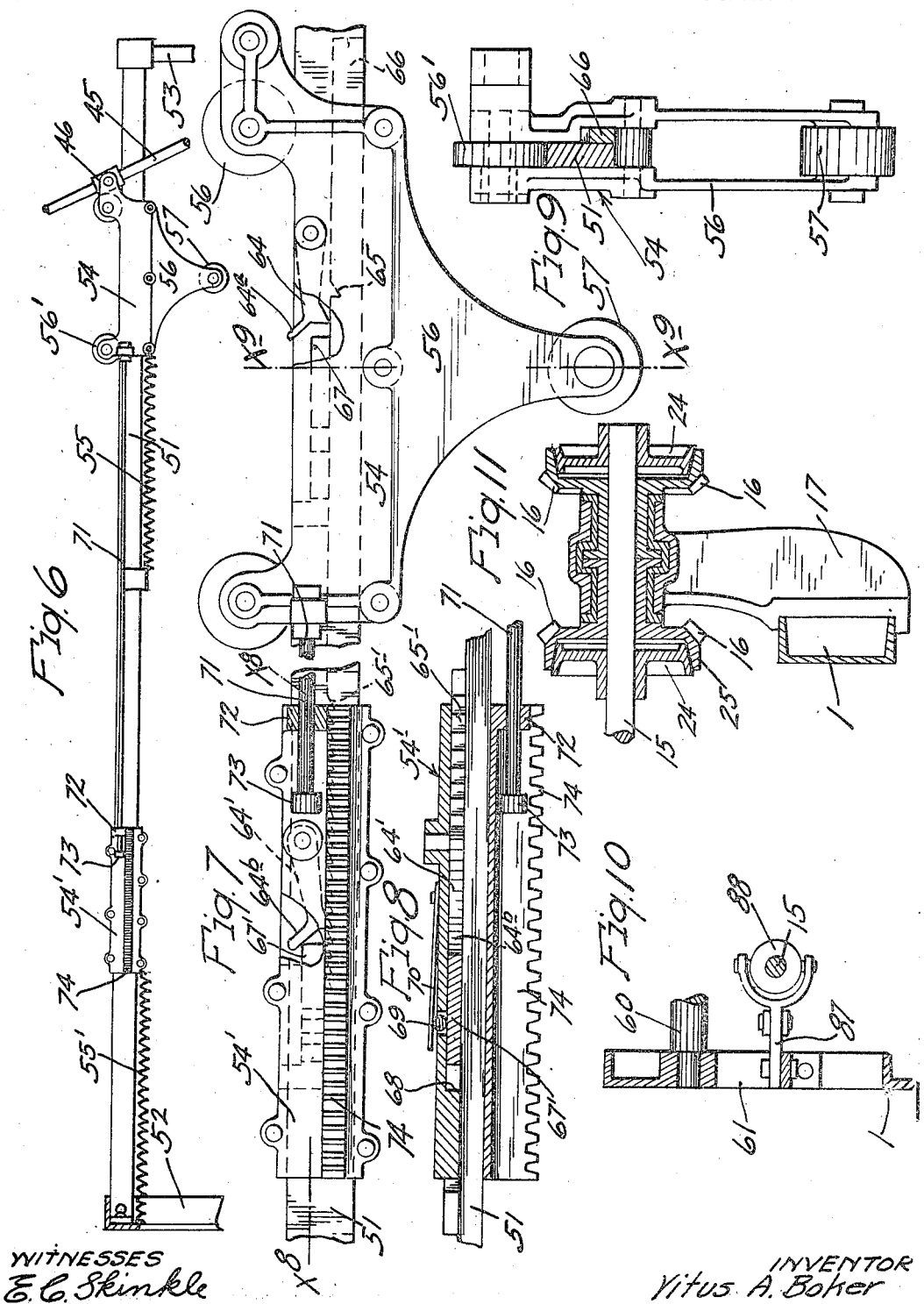

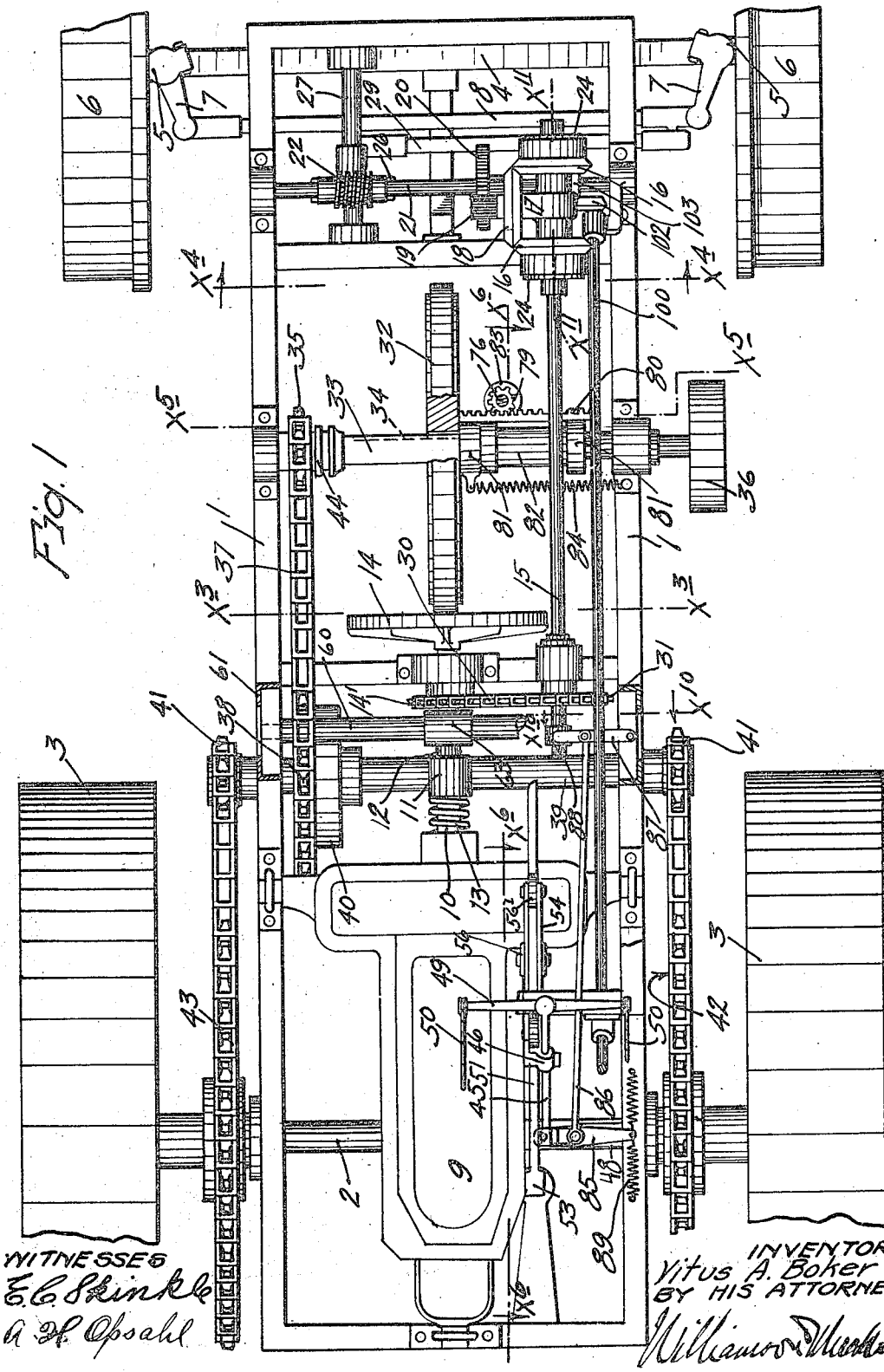

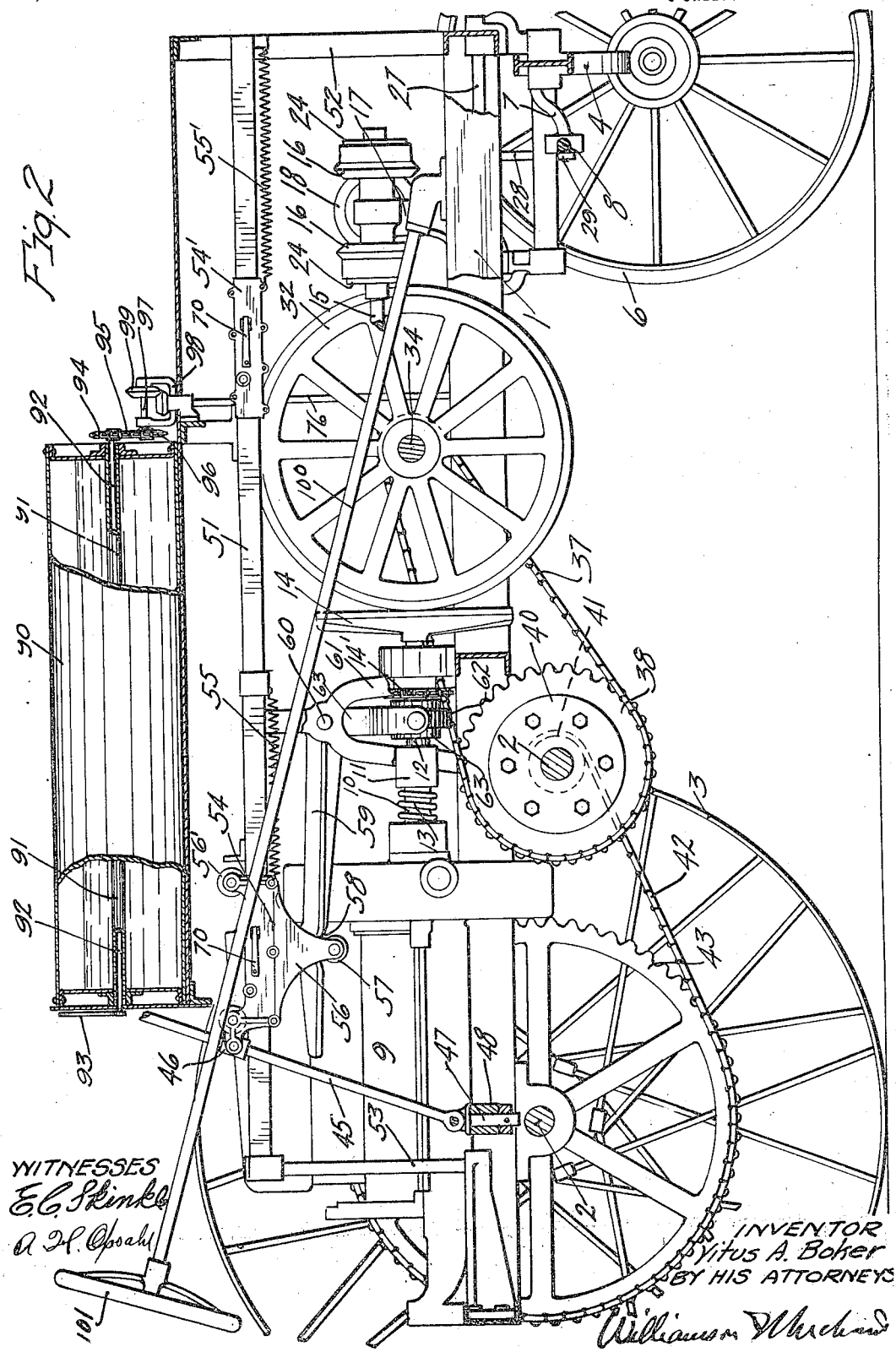

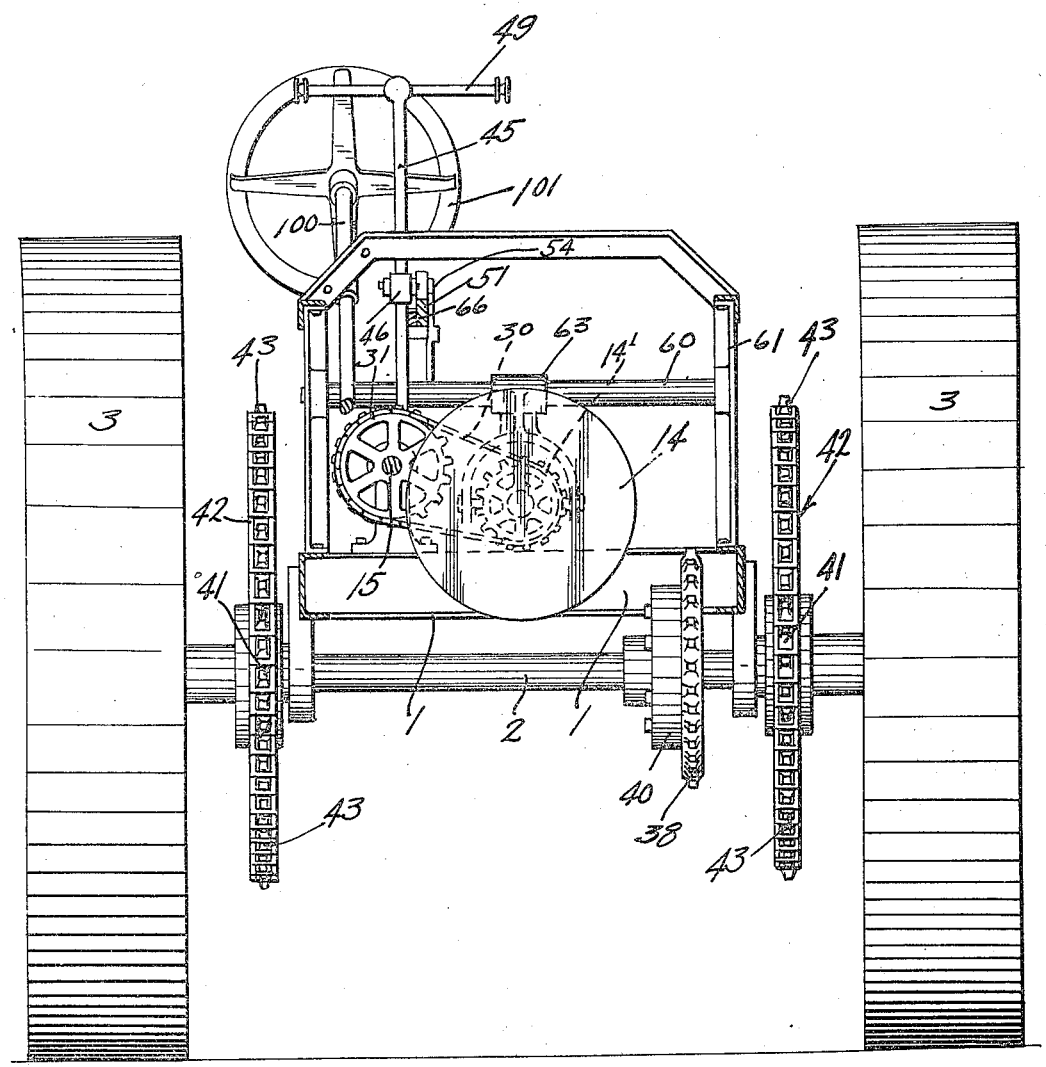

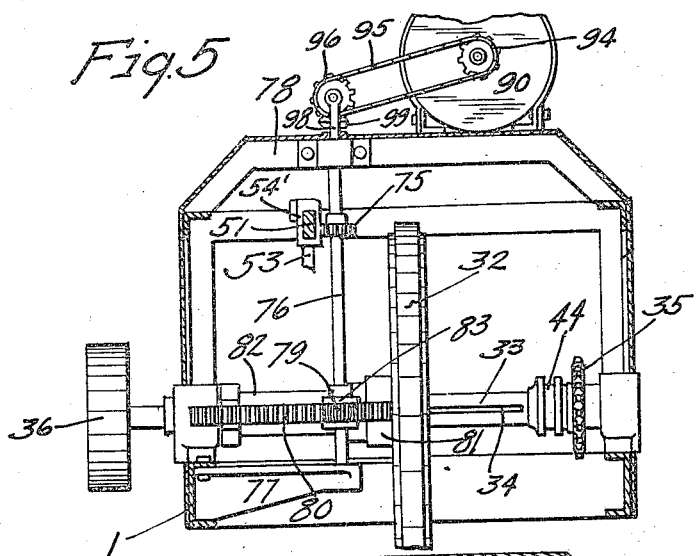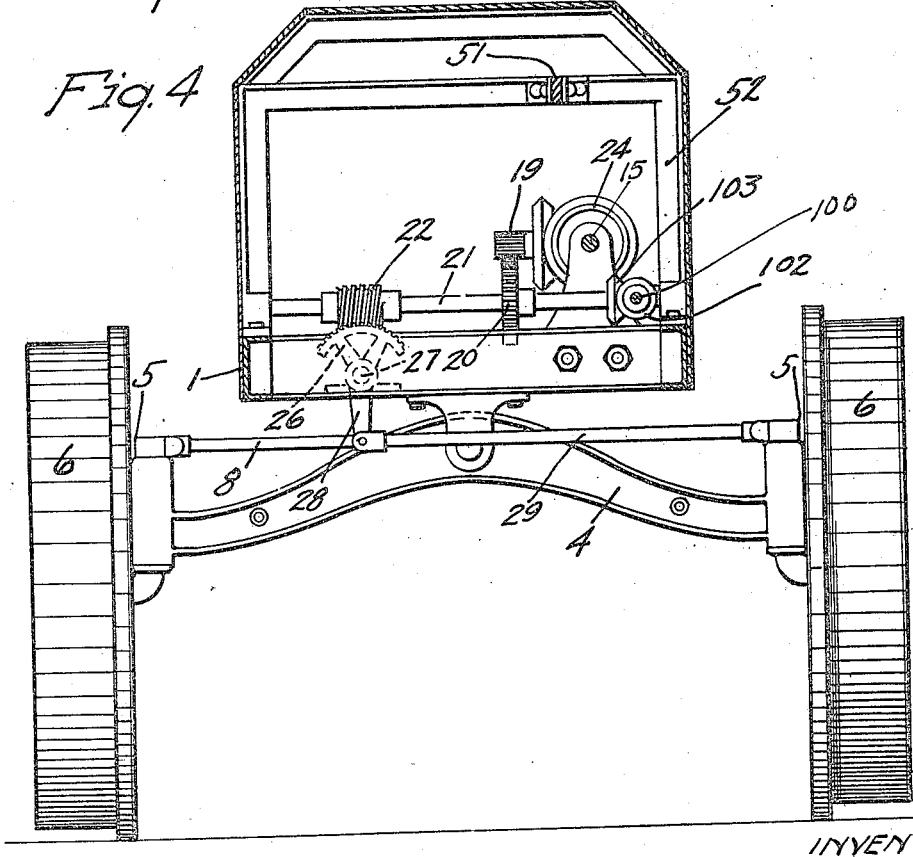

UNITED STATES PATENT OFFICE.

VITUS A. BOKER, OF MINNEAPOLIS, MINNESOTA.

TRACTOR.

1,214,643. Specification of Letters Patent. Patented Feb. 6, 1917.

Application filed October 18, 1915. Serial No. 56,508.

*To all whom it may concern:*

Be it known that I, VITUS A. BOKER, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

My present invention relates to tractors or motor propelled vehicles, and is in the nature of an improvement on or refinement of the construction disclosed and claimed in my pending application S. N. 783,292, filed August 6th, 1913, and entitled "Improved tractor" and in my prior Patent No. 1,111,-355, of date, September 22, 1914, entitled "Transmission mechanism".

Generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a plan view showing the tractor embodying my invention, some parts thereof being broken away, and some parts being sectioned; Fig. 2 is a side elevation of the tractor with some parts sectioned and some parts broken away; Fig. 3 is a transverse vertical section taken through the tractor approximately on the line $x^3$ $x^3$ of Fig. 1, looking rearward; Fig. 4 is a transverse vertical section taken through the tractor on the line $x^4$ $x^4$ of Fig. 1 looking forward; Fig. 5 is a vertical section taken on the line $x^5$ $x^5$ of Fig. 1; Fig. 6 is a detail in side elevation showing certain parts of the transmission controlling mechanism found in the vicinity of the line marked $x^6$ $x^6$ of Fig. 1; Fig. 7 is a side elevation showing on an enlarged scale, the parts shown in Fig. 6, some of the said parts being broken away and some being sectioned; Fig. 8 is a horizontal section taken approximately on the line $x^8$ $x^8$ of Fig. 7; Fig. 9 is a section taken approximately on the line $x^9$ $x^9$ of Fig. 7; Fig. 10 is a detail in section on the line $x^{10}$ $x^{10}$ of Fig. 1, some parts being broken away; and Fig. 11 is a detail in section taken approximately on the line $x^{11}$ $x^{11}$ of Fig. 1.

The motor propelled vehicle shown in the drawings is of a type generally designated as a farm tractor, and the frame thereof which is a rectangular structure, with suitable cross bars, is indicated as an entirety by the numeral 1. This tractor also comprises a rear axle 2, rear traction wheels 3, front axle 4 having pivoted stub axles 5, and front or steering wheels 6 journaled on the said stub axles. The stub axles 5, as is usual, are provided with projecting arms 7 connected by a cross link 8 which causes the said wheel 6 to partake of parallel angular or steering movements, such being the customary construction. The motor for propelling the tractor, as shown, is a multi-cylinder explosive engine indicated, as an entirety, by the numeral 9, and this engine, as shown, is suitably supported on the rear portion of the main frame 1. The engine crank shaft 10 is shown as connected by a telescoping slip coupling 11, to the rear end of a short driving shaft 12 that extends longitudinally of the tractor and is journaled in suitable bearings on the main frame 1. The socket member of the coupling 11 is secured to the said shaft 12, and the angular end of the crank shaft 10 is telescoped thereinto. A spring 13 surrounds the projecting end of the crank shaft 10 and is compressed between the engine casing and the socket of the said coupling, and hence, exerts a force yieldingly pressing the driving shaft 12 inward, for a purpose which will presently appear.

The driving shaft 12 carries a sprocket 14' and a face friction wheel 14. Also mounted in suitable bearings on the main frame 1 but offset laterally from the shaft 12, is a longitudinally extended counter shaft 15 provided at its front end with longitudinally spaced reversely faced beveled gears 16, (see particularly Figs. 1 and 11). These gears 16 have long sleeve-like hubs that are loose on the said shaft 15 and are journaled in a bearing afforded by the upper end of a bracket 17 that is rigidly secured to one of the cross beams of the frame 1. These beveled gears 16 mesh with the opposite sides of a beveled gear 18 that is also journaled to the upper end of the bracket 17. The gear 18, on its hub, carries a spur pinion 19 that meshes with a spur gear 20 carried by a transverse counter shaft 21 journaled in suitable bearings on the front portion of the frame 1. This transverse shaft 21 also carries a worm 22 (see Figs. 1 and 4).

The counter shaft 15 is capable of slight endwise movement and it carries two reversely faced driving cones 24 adapted to be alternately engaged by internal conical flanges carried by the respective gears 16. By again referring to Fig. 11, it will be noted that the said gears 16 are free to rotate but held against axial movements by the peculiar engagement with the bearing on the upper end of the bracket 17. Hence, very slight endwise movements of the shaft 15 will serve to alternately engage the cones 24 with their coöperating cones 25, and thereby connect, at will, either of the gears 16 for rotation with the said shaft 15. The above noted slight endwise movements are adapted to be imparted to the shaft 15 through connections which will be presently described.

A worm 22 on the transverse shaft 21, meshes with a worm gear or sector 26 shown as carried by a short rock shaft 27 mounted in suitable bearings on the front portion of the frame 1 and extend longitudinally of the said frame. This gear sector 26 has a depending arm 28 that is connected by a rod 29, to the steering link 28 which, it will be remembered, connects the arms 7 of the two front stub axles 5. The counter shaft 15 is driven from the driving shaft 12 through a sprocket chain 30 that runs over the sprocket 14' and over a sprocket 31 in the said shaft 15.

As is evident, through the connections described, the front or steering wheel 6 may, by the power from the engine, be simultaneously oscillated in the one direction or the other, according to which of the driving cones 24 are engaged with the cone flange 25 of the coöperating gear 16.

The so-called face friction wheel 14 on the driving shaft 12 constitutes one element of a variable speed transmission mechanism of the friction type, but it should be understood that this invention is not limited to transmission mechanism of such character. The said face friction wheel 14 is arranged for frictional engagement with the periphery of the so-called peripheral friction wheel 32 that is caused to rotate with a transverse shaft 33, by means of a long key or spline connection 34 (see Fig. 1), but is free to slide therein transversely of the machine. This shaft 33 is journaled in suitable bearings on the sides of the tractor frame 1, and, as shown, carries a sprocket 35 and a pulley 36, which latter is simply provided for conveying power from the engine while the tractor is standing still. A heavy sprocket chain 37 runs over the sprocket 35 and over a large sprocket 38 carried by a transverse counter shaft 39 located in front of the engine but below the main frame 1 and journaled in suitable bearings on the said frame. The said transverse shaft 39 is a divided shaft, the ends of which are connected through a suitable differential gear 40, the construction of which differential gear need not here be considered further than to state that the sprocket 38 is the master wheel of the said differential gear mechanism. The construction of the differential gear mechanisms are well known. The divided shaft 39, at its ends, carries relatively small sprockets 41, and sprocket chains 42 run over these sprockets and over much larger sprockets 43 carried by the hubs of the rear or traction wheels 3.

Connections have now been described whereby, when the transverse shaft 33 is driven from the engine, through the coöperating friction wheels 14 and 32, the tractor will be propelled. When the friction wheel 32 is alined with the axis of the friction wheel 14, as shown in Fig. 1, it will be in a neutral position and will not be rotated in either direction.

Inasmuch as it is often desirable to drive the shaft 33 and pulley 36 to afford power while the tractor is stationary, the sprocket 35 is connected to the said shaft 33 through a suitable clutch 44, the hub of which is indicated in part in Fig. 1.

In my pending application above identified, there is disclosed and broadly claimed a common controller for the transmission and steering mechanisms, and in my said prior patent above identified, I have disclosed and broadly claimed novel transmission controlling mechanisms. The present application involves modified and improved forms of these devices, and more particularly, of the transmission controlling mechanism. In this application, as in the said co-pending application, the chief element of the common controller is preferably in the form of an upright or oblique rod 45 (see Figs. 1, 2, 3 and 6), the upper portion of which is supported by and swiveled in a pivoted sleeve 46, with freedom for sliding movements therethrough. The said sleeve 46 is pivoted to a part presently to be described. At its lower end, the said controller rod 45 is pivoted to the upper end of an upright pin 47 that is swiveled to a cross bar 48 (see Fig. 2) of the main frame 1. At its upper end, the controller rod 45 is provided with a T-head or cross bar 49, to the ends of which, reins or controlling lines 50, or similar devices, are attached.

It will be remembered that the face friction wheel 14 is normally pressed into frictional engagement with the peripheral friction wheel 32, by the spring 13, and that the driving shaft 12 is free for slight endwise movements. This latter feature is to permit the friction wheel 14 to be moved out of frictional engagement with the said friction wheel 32. The means for automatically moving the friction wheel 14 into and out of engagement with the friction wheel 32 will be described a little later on.

Those devices which particularly relate to the transmission controlling mechanism will now be described.

Directing attention particularly to Figs. 2 and 6 to 9, inclusive, the numeral 51 indicates a horizontal guide bar extended in a direction from front to rear of the tractor, and supported at its front and rear ends, respectively, by upright frame portions 52 and 53 rigid on the main frame 1. Mounted for sliding movements on this guide bar 51 are so-called primary and secondary slides 54 and 54', respectively, the latter being located ahead of the former. These two slides are preferably made much alike, both being rectangular structures arranged to nearly or quite embrace the guide bar 51. These two slides are yieldingly drawn forward to extreme forward or normal positions, respectively, by coiled springs 55 and 55' attached thereto and anchored in respect to the guide bar 51. Here it should be noted that the sleeve 46 in which the controller rod 45 is mounted to oscillate and slide endwise, is pivoted to the rear portion of the primary slide 54 and the said primary slide is shown as provided with anti-friction rollers 56' that run on the upper edge of the guide bar 51, and furthermore, that the said primary slide has depending flanges 56 that carry a roller 57. This roller 57 normally engages in a notch 58 of a bell crank 59, which latter is pivoted at 60 (see Fig. 2) to a bracket 61 rigidly secured on the main frame 1. The depending arm of this bell crank 59 is pronged and pivoted to a shipper ring 62, within which is journaled a shipper collar 63 that is rigid on the driving shaft 12. With this construction described, whenever the primary slide 54 is moved rearward from its normal position, its initial movement in that direction will carry the roller 57 out of the notch 58 and onto the straight rear end portion of the long arm of the bell crank 59 and through said bell crank, will move the shaft 12 slightly rearward far enough to throw the face friction wheel 14 out of frictional contact with the peripheral friction wheel 32. The purpose of this action is to make it an easy matter to adjust the friction wheel 32 into different positions by removing the frictional contact between the two friction wheels.

The primary and secondary slides 54 and 54' carry, respectively, pivoted gravity-seated lock dogs 64 and 64', respectively. The lock dog 64 of the primary slide 54 coöperates with one or more lock notches or ratchet teeth 65 of a ratchet bar 66 rigidly secured to one side of the guide bar 51; and the lock dog 64' of the secondary slide 54' coöperates with a series of ratchet teeth 65' on the upper edge of the said ratchet bar 66. The said ratchet dogs 64 and 64' work in suitable recesses formed in the respective slides, and they are provided, respectively, with oblique cam extensions $64^a$ and $64^b$, respectively. The recesses in the said slides, that receive the said lock dogs, are extended so that they afford seats for small rectangular so-called tripping abutments 67 and 67', respectively. These tripping abutments are capable of limited sliding movements in respect to the slides in which they are mounted, between the free ends of the coöperating lock dogs and stop shoulders 68 formed on the respective slides. These tripping abutments are held against the adjacent faces of the guide bar 51 under a friction that is much greater than the friction between the said abutments and the respective slides, so that the said abutments, while not positively limited in their movements, in respect to the said relatively fixed guide bar 51, will, nevertheless, tend to stick thereto until positively driven either by engagement therewith of the coöperating shoulder 68, or of the coöperating lock dog. This relatively great friction between the tripping abutments and the bar 51 may be produced in different ways, but, as shown, is accomplished by placing anti-friction rollers 69 (see particularly Fig. 8) in recesses of the slides, between the tripping abutments and springs 70 applied on the respective slides 54 and 54'. The important function performed by the tripping abutments above described will appear in the description of the operation.

The secondary slide 54 is arranged to be set in different positions by movements of the primary slide, through a connection which is preferably a connecting rod 71 rigidly secured to the primary slide 54 at its rear end, and having its front end extended loosely through a lug 72 on the secondary slide 54, and terminated in a head 73.

On its inner face, the secondary slide 54' is provided with a rack bar 74, which (see particularly Fig. 5) meshes with a spur pinion 75 on an upright shaft 76 journaled at its lower end in a bearing 77 on the main frame 1 and journaled on its upper end in a suitable bearing on a housing 78 carried by the said frame. At a point approximately in line with the plane of the axis of the friction wheel 32, the shaft 76 is provided with another spur gear 79 that meshes with a rack bar 80. This rack bar 80 is extended parallel to the axis of the shaft 33, and at its inner end, is rigidly secured to a nonrotary collar 81, which, in turn, is swiveled to the hub of the friction wheel 32.

The rack 80 is secured to collars 81 that are swiveled on the long sleeve-like hub 82 of the friction wheel 32, so that the said rack will cause the said wheel 32 to move therewith, transversely of the machine. As a convenient means for holding the rack 80 against vertical movement, the inner end of said rack 80 is arranged to work between vertically spaced annular flanges 83 (see Fig. 5) on the pinion 79. Here it may be noted that for the sake of clearness, the upper flange of the said pinion 79 is removed in Fig. 1.

A coiled spring 84 (see Fig. 1) is anchored to the frame 1 and attached to the non-rotary collar 81 and exerts a force which extends to the observer (Fig. 1) and in a direction to set the said wheel for a slow reverse driving motion or in a position slightly nearer to the observer than shown in Fig. 1. For varying forward speeds, the wheel 32 is moved from the observer (Fig. 1) and laterally away from the axis of the friction wheel 14.

It has already been stated that the direction in which the machine will be steered is controlled by endwise movements of the shaft 15 which throws the one or the other of the clutch connections between the said shaft and gears 16 into action. This endwise movement of the said shaft 15 is produced by oscillating movement of the controlling rod 45, preferably through the following connections. (See Figs. 1 and 2.) Secured to the lower end of the swiveled pin 47, is an arm 85 that is connected by a long link 86 to the intermediate portion of a shipper lever 87, the outer end of which is pivoted to the frame 1, and the inner end of which is pronged and pivotally connected to a shipper collar 88 (see Figs. 1 and 10) that is swiveled between thrust collars on the shaft 15. I also preferably provide a yielding device for normally holding both of the clutch connections between the shaft 15 and gears 16 in neutral or released positions, so that the steering connections will remain set in any position in which they may be left after they are given adjustment, until they are again acted upon through the driving connections, by operation of one or the other of the clutches. This yielding centering device, as shown, is afforded by two opposing coiled springs 89 anchored to the frame 1 and attached to the free end of the lever 85, as shown in Fig. 1.

It is highly desirable that an indicator be provided for indicating to the operator the speed at which the variable speed transmission mechanism is set. This indicator may be applied in various different ways, but, as shown, it is conveniently applied in connection with an oil tank at 90, that is supported on top of the housing 78, with its axis extending from front to rear of the machine. In this application of the indicator, a bearing tube 91 is extended axially through the tank 90 and is connected to the heads of the tank with oil tight joints, and an indicator shaft 92 is passed through and journaled in this tube. At its rear end, the shaft 92 is provided with a pointer 93 that coöperates with a graduated dial on the rear end of the tank, (see particularly Figs. 2 and 5). At its front end, the shaft 92 has a small sprocket 94. A short sprocket chain 95 runs over the sprocket 94 and over a smaller sprocket 96 on one end of a short shaft 97 that is journaled in a bearing bracket 98 secured to the top of the casing or superframe 78. The extreme upper end of the shaft 76 before described, and which it will be remembered, controls the adjustments of the friction wheel 32, is extended upward through the bearing bracket 98 and is connected to the shaft 92 by a pair of miter gears 99. Thus, it will be seen that the pointer 93 will indicate the amount of adjustment of the friction wheel 32, or in other words, the position thereof, in respect to the axis of the friction wheel 14, and hence, will indicate the speed at which the transmission mechanism is set to operate and relative, of course, to the speed of the engine crank shaft.

The manner in which the power of the engine may be utilized to run the tractor, under a controller produced by oscillation of the controller rod 45 on its own axis, has already been made clear. It is sometimes desirable to be able to steer the tractor by hand power, and for this purpose, I provide a so-called auxiliary steering device, which, however, utilizes certain of the steering connections already described, and particularly, the counter shaft 21, worm 22, worm sector 26 and crank rod connection 29 and steering link 8. The application of this auxiliary steering device is made an easy matter because of the fact that both of the clutches which connect the shaft 15 to the gears 16 are normally held in releasing positions. This auxiliary steering device comprises an obliquely extended steering rod 100 (see Figs. 1, 2 and 4), mounted in suitable bearings on the tractor frame, provided at its rear end with a hand wheel 101, and provided at its front end with a miter gear 102 that meshes with a miter gear 103 on the said cross shaft 21. Obviously, any desired adjustments may be imparted to the steering connections through the engine operated device, and then, at will, any desired steering movements may be imparted to the said steering connections by manipulation of the auxiliary steering rod 100. Also, as is evident, the steering connections are irreversible in that they are normally locked by the worm 22 and sector 26 against force transmitted backward thereto from the front or steering wheels.

*Operation of variable speed transmission mechanism.*—It has already been stated that the transmission mechanism is controlled by forward and rearward oscillatory movements of the controlling rod 45, and the operations resulting from such adjustments of the steering rod will now be traced in detail, directing attention again particularly to Figs. 2, and 6 to 9, inclusive. Here it may be first noted that in Fig. 2, the mechanism is viewed from the right hand side of the tractor, while in Figs. 6 to 7, the mechanism is viewed from the left hand side of the machine. Movement is therefore toward the left, in respect to Fig. 2 and toward the right, in respect to Figs. 6, 7 and 8. Attention is now and again called to the fact that initial rearward movement of the primary slide 54, operating through the bell crank 59 moves the friction wheel 14 out of engagement with the friction wheel 32, so that the latter may be easily adjusted. When the primary slide 54 is moved rearward, its tripping abutment 67 first slips back against the stop shoulder 68 and is then caused to travel with the said slide. When the lock dog 64 is engaged with the notch or tooth 65, the said primary slide will be locked in position to hold the friction wheel 14 disengaged from the friction wheel 32. To release the lock dog 64 from the notch 65, the primary slide 54 must be moved rearward a little distance and then permitted to make, at least, a slight return forward movement. Under this initial return or forward movement, the tripping abutment 67, by its relatively great frictional contact with the fixed guide bar 51, will be caused to stick to the said bar and lag back, and by engagement with the cam projections 64ª, raise the dog 64 into a released position, thus unlocking the slide 54 from the said bar 51. When the said abutment 67 has thus released the said dog, it will thereafter be caused to travel forward with the said primary slide 54. Here it is highly important to note (see Figs. 6, 7 and 8) that the head 73 of the connecting rod 71 normally stands far enough away from the lug 72 of the secondary slide 54' to permit all of the movements of the primary slide just above noted. From this it follows that the primary slide may be moved rearward far enough to cause the release of the friction wheel 14 from the friction wheel 32, locked in such position to the bar 51, and also released from the said bar, without disturbing the secondary slide or causing any adjustments of the transmission mechanism. When the transmission mechanism is to be adjusted, the primary slide must be moved rearward farther than above noted, to-wit, it must be moved rearward, first far enough to bring the head 73 of the connecting rod 71 into contact with the lug 72 of the secondary slide 54', and then must be moved as much farther rearward as required to accomplish the desired adjustment of the said transmission mechanism.

In Fig. 1, the adjustable friction wheel 32 is shown as at the neutral point, but when the secondary slide 54' is set in its extreme forward position, as shown in Figs. 6, 7 and 8, the said wheel 32 will be set slightly toward the observer, in respect to Fig. 1, and in a position for slow reverse transmission. By the proper rearward movement of the primary slide, the secondary slide may be drawn rearward into position to set the friction wheel 32 for any desired forward transmission. When the secondary slide 54' is drawn rearward, its tripping abutment 67', by its relatively great frictional contact with the bar 51, will stick to the latter, or lag back until it is engaged by the shoulder 68 of the secondary slide, and thereafter it will be caused to move rearward with the said secondary slide and will then assume a position permitting the lock dog 64' to drop into engagement with the alined ratchet tooth 65' of the said bar 51, and thus lock the said secondary slide in any position in which it may be set.

To release the dog 64' from the engaged tooth 65', with the closely positioned teeth shown, it is necessary, by rearward movements of the controller rod 45 and primary slide 54, to draw the secondary slide 54' far enough rearward to carry the point of the dog 64' some little distance back upon the smooth or toothless portion of the rack bar 65', and then to allow the said parts to make a slight return forward movement. Under this slight return forward movement, the tripping abutment 67', will stick to the bar 51, and, by engagement with the cam end 64ᵇ of the said dog 64', will raise the same into an inoperative position above the teeth of the rack, and thereafter, under continued forward movement of the said parts, the said abutment will travel with the secondary slide 54' and hold the said dog 64' in its inoperative position until the said secondary slide has again been given a slight rearward movement while the point of the said dog is over the teeth 65'. Here it should be stated that the movement of the tripping abutment 67', in respect to the secondary slide 54' is of such an extent that it will not be caused to release the dog 64' of the engaged tooth 65', by movement of the said secondary slide a distance represented by one of the said teeth 65'.

The operations of the various devices above described are now thought to have been made clear. It may be here stated that the drawings of this application are taken from a full sized operative machine, the operativeness of which has been demonstrated in practice.

What I claim is:

1. In a motor propelled vehicle, the combination with motor propelled steering mechanism and motor propelled transmission mechanism, of a common controller having two different movements, the one movement thereof serving to manipulate said transmission mechanism and the other movement thereof serving to manipulate said steering mechanism, and an auxiliary manually operated steering device operative at will and without interfering with the adjustment of said transmission mechanism.

2. In a motor-propelled vehicle, a motor-propelled transmission mechanism, a motor-propelled steering mechanism, including reversible and irreversible elements, and a manually operated steering device connected to the reversible element of the said motor propelled steering mechanism.

3. In a motor-propelled vehicle, a motor-propelled transmission mechanism and a motor-propelled steering mechanism, said latter including a driving shaft driven in a constant direction, a reversible driven shaft and a reversible frictional drive for connecting said driving and driven shafts, in combination with a manually operated auxiliary steering device connected to the said reversible driven shaft of said motor-propelled steering mechanism.

4. In a transmission mechanism, the combination with coöperating members, of means for adjusting one of the said members in respect to the other, comprising a slide having connections to the adjustable member, a lock for securing said slide in different positions, a yieldingly anchored trip for said lock having a limited movement only in respect to said slide, connections for separating the said members, and means operative on said connections to secure said members in separated positions and to again restore the same to connected positions, without interfering with the adjustments of said slide.

5. The combination with coöperating friction wheels, of means for adjusting one of said friction wheels in respect to the axis of the other, for variable speeds, a fixed guide having ratchet teeth, a slide mounted on said guide and having a lock dog engageable with the ratchet teeth thereof, to lock said slide in different positions, the said slide having connections for adjusting said movable friction wheel for different speeds, a pawl trip frictionally anchored to said guide and having a limited movement only in respect to said slide, the said guide having a toothless portion, whereby said trip may be caused to release said dog, connections for effecting the separation of said friction wheels, and a lock for said latter connections operative to hold said friction wheels separated and to release the same for coöperative engagement without changing the adjustment of said slide.

6. The combination with coöperating friction wheels, of means for adjusting one of said friction wheels in respect to the axis of the other, for variable speeds, a fixed guide having ratchet teeth, a slide mounted on said guide and having a lock dog engageable with the ratchet teeth thereof, to lock said slide in different positions, the said slide having connections for adjusting said movable friction wheel for different speeds, a pawl trip frictionally anchored to said guide and having a limited movement only in respect to said slide, the said guide having a toothless portion, whereby said trip may be caused to release said dog, connections for effecting the separation of said friction wheels, a lock for said latter connections operative to hold said friction wheels separated and to release the same for coöperative engagement without changing the adjustment of said slide, and a manually operated controller with connections for operating said slide and the said lock for holding said wheel separated.

7. The combination with coöperating transmission wheels, of means for moving one of said wheels in respect to the other, comprising a relatively fixed guide having ratchet teeth, primary and secondary slides movable on said guide and having limited movements, one in respect to the other, yielding means tending to move said slides in a common direction, a connection to said primary slide for moving the same against the tension of said yielding means, a connection between said secondary slide and the adjustable wheel, lock dogs on said slides engageable with the teeth of said guide to lock said slides in different positions, and dog trips yieldingly anchored in respect to said guide and having limited movements only in respect to the coöperating dogs and slides.

8. The combination with coöperating transmission wheels, of means for moving one of said wheels in respect to the other, comprising a relatively fixed guide having ratchet teeth, primary and secondary slides movable on said guide and having limited movements, one in respect to the other, yielding means tending to move said slides in a common direction, a connection to said primary slide for moving the same against the tension of said yielding means, a connection between said secondary slide and the adjustable wheel, lock dogs on said slides engageable with the teeth of said guide to lock said said slides in different positions, dog trips yieldingly anchored in respect to said guide and having limited movements only in respect to the coöperating dogs and slides, and a connection between said primary slide and one of the said wheels for moving the same into and out of coöperative engagement.

9. The combination with coöperating transmission wheels, of means for moving one of said wheels in respect to the other, comprising a relatively fixed guide having ratchet teeth, primary and secondary slides movable on said guide and having limited movements, one in respect to the other, yielding means tending to move said slides in a common direction, a connection to said primary slide for moving the same against the tension of said yielding means, a connection between said secondary slide and the adjustable wheel, lock dogs on said slides engageable with the teeth of said guide to lock said slides in different positions, dog trips yieldingly anchored in respect to said guide and having limited movements only in respect to the coöperating dogs and slides, a connection between said primary slide and one of the said wheels for moving the same into and out of coöperative engagement, and the connection between the said two slides being such as to permit said primary slide to be locked to said guide in a position to hold the said wheels disconnected, without disturbing the adjustments of said secondary slide and the wheels for variable speed.

10. In a transmission mechanism, the combination with a guide, of primary and secondary slides mounted on said guide, one ahead of the other, said slides being connected for limited movement one in respect to the other, means for independently locking said two slides to said guide and for releasing the same, a connection from said primary slide to a movable part of the transmission mechanism for producing one adjustment, and a connection from said secondary slide to a movable part of the transmission mechanism for accomplishing another adjustment of the said transmission mechanism.

11. In a transmission mechanism, the combination with a guide, of primary and secondary slides mounted on said guide, one ahead of the other, said slides being connected for limited movement one in respect to the other, means for independently locking said two slides to said guide and for releasing the same, a connection from said primary slide to a movable part of the transmission mechanism for producing one adjustment, and a connection from said secondary slide to a movable part of the transmission mechanism for accomplishing another adjustment of the said transmission mechanism, the said parts being combined with a steering mechanism, and a common controller having two movements, the one for operating said steering mechanism and the other for imparting movement to said primary slide.

12. In a transmission mechanism, the combination with coöperating transmission wheels adjustable, one in respect to the other, of a relatively fixed guide having ratchet teeth and intervening smooth surface, primary and secondary slides movable on said guide and provided with lock dogs coöperating with said ratchet teeth to independently lock said slides to said guide, a connection between said slides permitting limited movements of one in respect to the other, dog trips frictionally anchored to said guide, and having limited movements only in respect to the respective slides, a connection between said secondary slide and the movable transmission wheel, and manually operated means for moving the said primary slide.

13. In a transmission mechanism, the combination with coöperating transmission wheels adjustable, one in respect to the other, of a relatively fixed guide having ratchet teeth and intervening smooth surface, primary and secondary slides movable on said guide and provided with lock dogs coöperating with said ratchet teeth to independently lock said slides to said guide, a connection between said slides permitting limited movements of one in respect to the other, dog trips frictionally anchored to said guide and having limited movements only in respect to the respective slides, a connection between said secondary slide and the movable transmission wheel, yielding devices tending to move said slides in a common direction, and a manually operated controller connected to said primary slide for moving the same against the tension of said yielding means.

14. In a transmission mechanism, the combination with coöperating transmission wheels adjustable, one in respect to the other, of a relatively fixed guide having ratchet teeth and intervening smooth surface, primary and secondary slides movable on said guide and provided with lock dogs coöperating with said ratchet teeth to independently lock said slides to said guide, a connection between said slides permitting limited movements of one in respect to the other, dog trips frictionally anchored to said guide and having limited movements only in respect to the respective slides, a connection between said secondary slide and the movable transmission wheel, and a connection actuated by said primary slide and operative to disconnect certain of the transmission elements of the said transmission mechanism.

15. In a transmission mechanism, the combination with coöperating transmission wheels adjustable, one in respect to the other, of a relatively fixed guide having ratchet teeth and intervening smooth surface, primary and secondary slides movable on said guide and provided with lock dogs coöperating with said ratchet teeth to independently lock said slides to said guide, a connection between said slides permitting limited movements of one in respect to the other, dog trips frictionally anchored to said guide and having limited movements only in respect to the respective slides, a connection between said secondary slide and the movable transmission wheel, a connection actuated by said primary slide and operative to disconnect certain of the transmission elements of the said transmission mechanism, and a controller for moving said primary slide against the tension of said yielding means, the connection between said primary and secondary slides permitting the said primary slide to be locked to said guide, in position to render said transmission mechanism inoperative, through the connections described, without disturbing the said secondary slide.

In testimony whereof I affix my signature in presence of two witnesses.

VITUS A. BOKER.

Witnesses:
CLARA DEMAREST,
BERNICE G. WHEELER.